(12) United States Patent
Wall

(10) Patent No.: US 6,856,685 B1
(45) Date of Patent: Feb. 15, 2005

(54) FEED ARRANGEMENT FOR A SUBSCRIBER LOOP WITH MULTI-LEVEL CURRENT REGULATION CAPABILITY

(75) Inventor: Brian G. Wall, Nepean (CA)

(73) Assignee: Nortel Networks Limited, St-Laurent (CA)

(*) Notice: Subject to any disclaimer, the term of this patent is extended or adjusted under 35 U.S.C. 154(b) by 456 days.

(21) Appl. No.: 09/672,812

(22) Filed: Sep. 29, 2000

(51) Int. Cl.[7] .......................... H04M 1/00; H04M 9/00; H04M 9/08
(52) U.S. Cl. .................... 379/413; 379/377; 379/400
(58) Field of Search ............................ 379/377, 324, 379/400, 413

(56) References Cited

U.S. PATENT DOCUMENTS 5,249,226 A * 9/1993 Schopfer .................... 379/413
5,333,196 A * 7/1994 Jakab ........................ 379/413
6,178,241 B1 * 1/2001 Zhou ......................... 379/382

* cited by examiner

Primary Examiner—Curtis Kuntz
Assistant Examiner—Alexander Jamal

(57) ABSTRACT

A feed arrangement for a telephone subscriber loop. The feed arrangement includes an input for connection to a power supply and an output for connection to the TIP and RING conductors of the subscriber loop. A control element regulates the current in the subscriber loop to a target value selected in a set of possible target values. When the control element senses that an additional telephone instrument becomes active in the subscriber loop, a new target value is selected. The new target value is such that the current is sufficient to power all the telephone instruments that are currently active in the subscriber loop while low enough to avoid an excessive power dissipation at the feed arrangement and also to limit the power consumption.

25 Claims, 2 Drawing Sheets

FEED ARRANGEMENT FOR A SUBSCRIBER LOOP WITH MULTI-LEVEL CURRENT REGULATION CAPABILITY

FIELD OF THE INVENTION

The present invention relates to a feed arrangement for a telephone subscriber loop. More specifically, it pertains to a feed arrangement for controlling the subscriber loop current in dependence of the number of Customer Premises Equipments (CPE) active on the loop.

BACKGROUND OF THE INVENTION

With the arrival and expansion of the Information Highway, telephone networks have been slowly converted from an all-analog environment to a virtually all-digital network. Within these networks, the trunks and switches have been virtually 100 percent converted. However, the local loops leading to the customer remain largely analog, specifically the analog loop connecting the Central Office (CO) of the Public Switched Telephone Network (PSTN) to the subscribers' CPE.

Within the traditional telephone networks, a copper loop (or two-conductor cable), known as the subscriber loop, connecting the CO and the CPE is used to provide the POTS, whose signals are Voice Frequency (VF) signals in the frequency range of 0–4 kHz. The subscriber loop is capable of carrying signals up to several MHz, depending on its length and type. The two conductors of the subscriber loop are referred to as the TIP and RING, providing Plain Old Telephone Service (POTS) at both the subscriber premise and the CO.

Most CPEs draw DC current from the subscriber loop that connects them to the CO. For satisfactory operation, a typical CPE requires a current in the range of 18 mA to 50 mA. This DC loop current is provided by the 52 V CO power supply, whose terminals are typically coupled to the subscriber loop via a feed arrangement including two feed resistors. The DC resistance measured between the TIP and RING of the subscriber loop (including the CPE), also referred to as external resistance, is typically in the range of 100 to 1900 ohms and depends upon the length of the subscriber loop. To provide sufficient loop current for the operation of the CPE with the longest subscriber loop, the value of the feed resistors is typically limited to 200 ohm each. In this case, the loop current is calculated to be $I_{loop}$=52 V/(400+1900) ohm=22.6 mA, which is above the minimum current required for proper operation of the CPE. In the case of a short subscriber loop, one having a resistance of 100 ohm, the loop current is $I_{loop}$=52 V/(400+100) ohm=104 mA, which exceeds the desired range of loop current for proper CPE operation. In addition, this high value of DC loop current results in an excessive amount of power dissipation and consumption by the subscriber loop feed arrangement, specifically 4.32 Watts and 5.40 Watts, respectively.

A technique that has been employed with success to limit subscriber loop current to a threshold value, and consequently limit power dissipation and consumption, is described in U.S. Pat. No. 5,333,196, which issued Jul. 26, 1994 to Jakab and was assigned to Northern Telecom Limited. The contents of this document are incorporated herein by reference. The feed arrangement limits the DC loop current on short loops to a lower value, for example 30 mA, which in turn limits the power dissipation.

While the arrangement taught by Jakab does successfully limit the loop current and reduce the level of power dissipation and consumption, there is still room for improvement, in particular in instances when more than one CPE is connected to the subscriber loop. For example, when a first CPE is connected to the subscriber loop and then an additional CPE is switched on the subscriber loop, the current demands change significantly since the external resistance of the subscriber loop abruptly changes.

The background information provided above clearly indicates that there exists a need in the industry to provide a feed arrangement for a subscriber loop with an advanced current regulation capability capable of supporting multiple CPEs that can become active at any given time.

SUMMARY OF THE INVENTION

In a broad aspect the invention provides a feed arrangement for a telephone subscriber loop. The feed arrangement has a control element that can regulate the magnitude of the current in the subscriber loop to a target value selected in a set of target values, in dependence upon a number of CPEs active in the telephone subscriber loop.

The advantage of this feed arrangement is a reduction of power consumption when one CPE is active on the subscriber loop, while allowing for an automatic adjustment of the current when an additional CPE becomes active.

In a specific example of implementation, the feed arrangement has an input that connects to a power supply, such as a Solid State Line Interface Circuit (SLIC). The control element has provisions to assess the magnitude of the current in the subscriber loop. On the basis of the current magnitude the control element generates an output control signal that determines the voltage that the power supply will generate. The voltage is controlled such as to regulate the magnitude of the current in the subscriber loop to a first target value when only one CPE is active in the loop, and to a second, higher target value when an additional CPE becomes active in the subscriber loop.

In a possible variant, the feed arrangement can be designed to accommodate more than two CPEs. In such case, the magnitude of the current can be increased stepwise for any additional CPE that becomes active in the subscriber loop.

The control element can be implemented in software on any suitable computing platform. The software logic is designed to observe the current in the subscriber loop to derive the number of CPEs that are active in the subscriber loop. When one CPE is connected in the subscriber loop and then suddenly another CPE becomes active, the external resistance of the subscriber loop diminishes abruptly. This results in an increase of the current in the loop. This increase is detected by the control element and interpreted as the actuation of an additional CPE. As a result, the control element then switches to a different current target value and adjusts the output control signal trail regulates the power supply, accordingly.

In a possible variant, the control element can be implemented in hardware, instead of software.

In another aspect the invention provides a method for regulating the magnitude of the current in a subscriber loop. The method comprises regulating the magnitude of the current to a first target value when a first CPE is connected to the subscriber loop and regulating the magnitude of the current to a second target value, higher than the first target value when at least one additional CPE is connected to the subscriber loop such that the subscriber loop feeds at least two CPEs simultaneously.

BRIEF DESCRIPTION OF THE DRAWINGS

A detailed description of examples of implementation of the present invention is provided hereinbelow with reference to the following drawings, in which.

Figure 1:
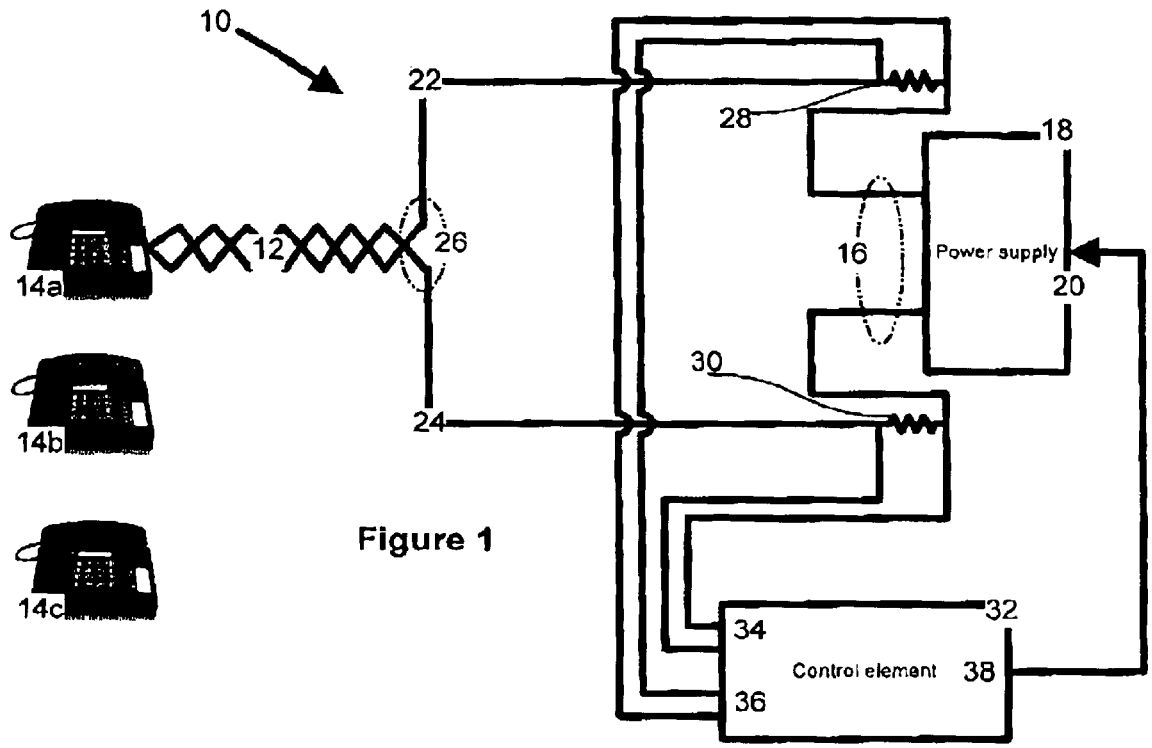
FIG. 1 is a block diagram of a feed arrangement in accordance with a specific and non-limiting example of implementation of the invention.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION

FIG. 1 illustrates a feed arrangement 10 constructed in accordance with a specific and non-limiting example of implementation of the invention. The feed arrangement 10 is designed to supply electrical power to a subscriber loop 12 on which one or more CPEs 14a, 14b, 14c, etc. may become active at any given time. The subscriber loop includes a TIP conductor and a RING conductor. When a CPE 14a, 14b or 14c connects to the telephone subscriber loop 12 it is connected across the TIP and RING conductors of the telephone subscriber loop 12.

The feed arrangement includes an input 16 that connects to a DC voltage power supply 18. The power supply 18 can be a SLIC circuit that is of a type known in the art, or of any other suitable variety. The power supply has an input 20 to receive a control signal for regulating the magnitude of the DC voltage that the power supply 18 applies at the input 16.

The feed arrangement 10 has a pair of power supply rails; namely a TIP power supply rail 22 and a RING power supply rail 24. The power supply rails 22, 24 terminate at an output 26 at which the TIP and the RING conductors of the subscriber loop connect. The power supply rails 22, 24 include current limiting resistors 28, 30.

The feed arrangement includes a control element 32 that regulates the DC voltage generated by the power supply 10 for, in turn, regulating the magnitude of the current in the subscriber loop 12. The control element 32 has a first input 34 and a second input 36 that connect to the current limiting resistors 30, 28 respectively, to receive the voltage drop at those resistors. Since the value of the resistors 28, 30 is fixed and known, the current in the respective power supply rails 22, 24 can be computed. On the basis of the signals applied at the inputs 34 and 36 the control element 32 generates a control signal at output 38 that is applied at the input to regulate the magnitude of the DC voltage produced by the power supply 18.

Figure 2:
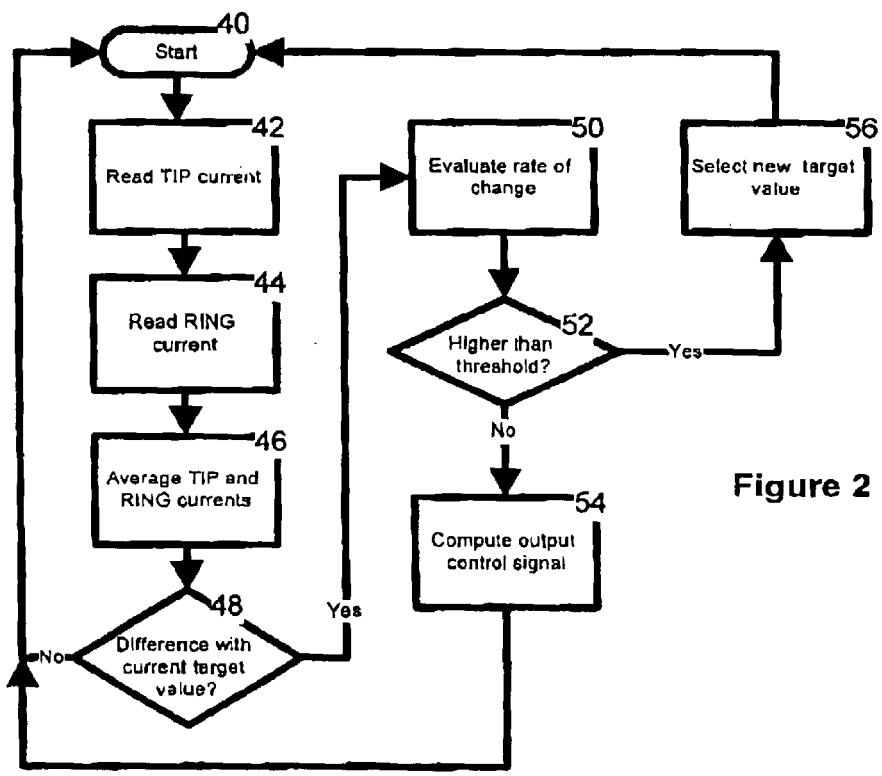
FIG. 2 is a flow chart that illustrates the process implemented by a control element of the feed arrangement of FIG. 1 to regulate the current in the subscriber loop.

The logic that defines the functionality of the control element 32 is illustrated by the flowchart at FIG. 2. The process starts at step 40. At step 42 the control element reads the current in the TIP power supply rail 22 (which is the same as the current in the TIP conductor of the telephone subscriber loop 12). As discussed previously, this is done by observing the voltage drop at the resistor 28 and then dividing it by the value of the resistor 28. At step 44 the same process is repeated, this time in connection with the RING power supply rail 24 (the current is the same as the current in the RING conductor of the telephone subscriber loop 12). At step 46 an average value of the currents in the TIP and in the RING power supply rails is computed.

At decision step 48 the average current value is compared to a target value. The target value is set such that the current in the subscriber loop 12 will be sufficient to power a single telephone instrument 14a, while low enough to avoid an excessive power dissipation at the feed arrangement 10 and also to limit the power consumption. In one specific example, the target value for the average current magnitude when a single CPE 14a is connected to the subscriber loop 12 is of about 18 mA.

If decision step 48 is answered in the negative, i.e. the average current magnitude in the subscriber loop 12 is very close to the target value, no further action is taken and the process resumes at step 40 for another execution cycle. On the other hand, if the average current magnitude in the subscriber loop 12 is not identical to the target value, the process computes at step 50 the rate of change of the current magnitude from the previous current value read during a previous execution cycle.

At decision step 52 the rate of change is compared to a threshold. This decision step is designed to detect if an additional CPE has become active on the subscriber loop 12. If no additional CPE has become active on the subscriber loop and the latter powers only the CPE 14a, then the average current in the subscriber loop will vary little over time and if variations occur they will be slow (small rate of change) On the other hand, if an additional CPE (for the sake of this example say telephone instrument 14b) becomes active, the external resistance of the subscriber loop, i.e., the resistance as seen from the output 26, will diminish abruptly in light of the fact that two CPEs are now connected in parallel. Accordingly, the average current in the subscriber loop will increase in magnitude significantly and will do so at a high rate. The value of the threshold is selected such that current variation rates that do not result from the activation of an additional CPE are below the threshold, and current variation rates that result from the activation of one or more additional CPEs are above the threshold.

If the decision step 52 is answered in the negative, the process continues at step 54 where a control signal is generated at output 38 to reduce the value of the difference observed at step 48 between the average current magnitude and the target value. Any suitable feedback error reduction algorithm can be used without departing from the spirit of the invention. The output signal generated at step 54 is applied to the input 20 of the power supply 18 such that the DC voltage of the power supply will vary sufficiently to compensate for the error in the current value.

In the alternative that the decision step 52 is answered in the affirmative, the process continues at step 56 that computes a new current target value. One possibility to assess the new current target value is to associate in a table different rate of current changes to corresponding current target values. The new target value is extracted from the table by inputting the observed current rate of change. This approach is flexible in that it creates a set of target values, where each target value is associated to a different number of CPEs that can go active at the same time in the subscriber loop. The number of target values in the set can vary without departing from the spirit of the invention.

Each target value is selected to provide enough current to properly feed the number of CPEs connected simultaneously on the subscriber loop, while avoiding excessive power dissipation and power consumption at the feed arrangement 10. In general, the higher the number of CPEs that need to be supported at the same time, the higher the target value will be. In a specific and a non-limitative example, the current target value when two CPEs are active on the subscriber loop can be of about 30 mA.

Figure 3:
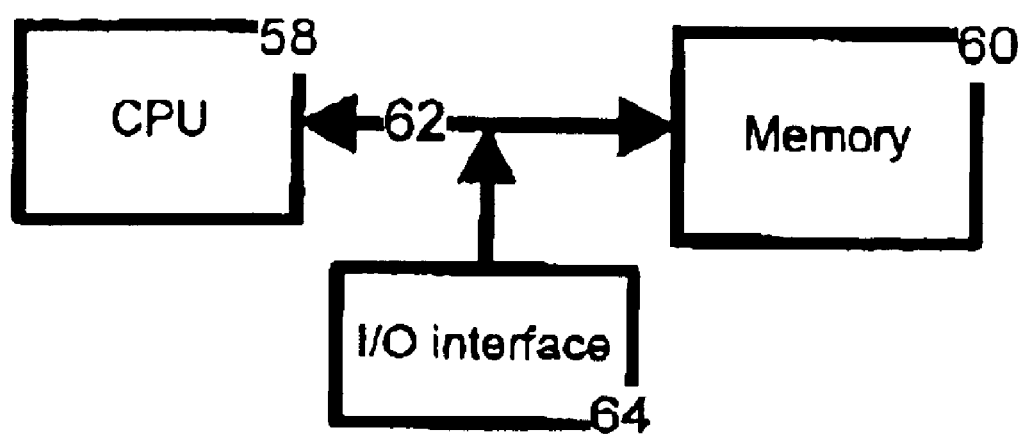
FIG. 3 is a block diagram of a computing platform to implement in software the process illustrated in FIG. 2.

The process illustrated at FIG. 2 can be implemented in software on any suitable computing platform. A generic computing platform is illustrated at FIG. 3. The computing platform includes a Central Processing Unit (CPU) 58 connected to a memory 60 by a data bus 62. The memory 60 contains the program instructions that when executed by the CPU 58 implement the functionality of the control element 32 described earlier. An Input/Output (I/O) interface 64 also connects to the data bus 62 to extract or deliver signals that the control element 32 exchanges with the external world, such as the signals at inputs 34, 36 and the signal at output 38.

In one possible variant, the current in the subscriber loop is assessed simply by observing the voltage drop at one resistor 28, 30 instead of at the two resistors 28, 30. This alternative yields acceptable results since in most cases, the current in the TIP power rail will be the same as the current in the RING power rail.

Another possible variant is to realize the control element 32 in hardware instead of in software.

Although various embodiments have been illustrated, this was for the purpose of describing, but not limiting, the invention. Various modifications will become apparent to those skilled in the art and are within the scope of this invention, which is defined more particularly by the attached claims.

What is claimed is:

1. A feed arrangement for a subscriber loop having a plurality of conductors, comprising:
    a) an output for connection to the conductors of the subscriber loop to impress across the conductors a voltage differential; and
    b) a control element operative for:
        i. deriving a data element indicative of a rate of change of a current in the subscriber loop;
        ii. processing the data element indicative of a rate of change of a current in the subscriber loop to derive a variation in a number of CPEs active in the subscriber loop;
        iii. determining a target loop current on the basis of the variation in a number of CPEs active in the subscriber loop; and
        iv. regulating a magnitude of a current in the subscriber loop to the target loop current.

2. A feed arrangement as defined in claim 1, wherein said control element being operative for determining a target loop current on the basis of the variation in a number of CPEs active in the subscriber loop comprises said control element being operative for selecting the target loop current from a set of target loop currents, each target loop current in said set of target loop currents being associated to a respective variation in a number of CPEs active in the subscriber loop.

3. A feed arrangement as defined in claim 2, wherein the target loop current determined by said control element when A CPEs are active in the subscriber loop is higher than the target loop current determined by said control element when B CPEs are active in the subscriber loop, where A>B.

4. A feed arrangement as defined in claim 3, wherein A is at least 1.

5. A feed arrangement as defined in claim 3, wherein the subscriber loop includes a tip conductor and a ring conductor, a CPE active in the subscriber loop being connected across the tip conductor and the ring conductor.

6. A feed arrangement as defined in claim 5, wherein said control element includes at least one control input for receiving an input control signal indicative of the magnitude of a current in the tip conductor.

7. A feed arrangement as defined in claim 6, wherein:
    a) said control input is a first control input;
    b) said input control signal is a first input control signal; and
    c) said control element includes a second control input for receiving a second input control signal indicative of a magnitude of a current in the ring conductor.

8. A feed arrangement as defined in claim 7, wherein:
    a) said feed arrangement includes an input for connection to a power supply that generates an output voltage applied to the input of said feed arrangement;
    b) said control element is responsive to the first and second input control signals to generate an output control signal;
    c) said control element includes an output to release the output control signal; and
    d) the output control signal being suitable for controlling the output voltage of the power supply such as to bring about in the subscriber loop a current having a magnitude that corresponds generally to a target loop current determined by said control element.

9. A feed arrangement as defined in claim 1, wherein the target loop current is sufficiently high to power a new number of CPEs active in the subscriber loop reflecting the variation in a number of CPEs active in the subscriber loop and sufficiently low to result in a decrease in power consumption at the feed arrangement when the variation in a number of CPEs active in the subscriber loop is a decrease in a number of CPEs active in the subscriber loop.

10. In combination:
    a) a power supply;
    b) a feed arrangement for a subscriber loop having a plurality of conductors, including:
        i) an input connected to said power supply;
        ii) an output for connection to the conductors of the subscriber loop to impress across the conductors a voltage differential; and
        iii) a control element operative for:
            a. deriving a data element indicative of a rate of change of a current in the subscriber loop;
            b. processing the data element indicative of a rate of change of a current in the subscriber loop to derive a variation in a number of CPEs active in the subscriber loop;
            c. determining a target loop current on the basis of the variation in a number of CPEs active in the subscriber loop; and
            d. regulating a magnitude of a current in the subscriber loop to the target loop current.

11. A combination as defined in claim 10, wherein:
    a) said control element includes an output to release an output control signal;
    b) said output being in communication with said power supply; and
    c) said power supply being responsive to the output control signal to impress a voltage differential at said input to bring about in the subscriber loop a current having a magnitude corresponding generally to the target loop current.

12. A combination as defined in claim 10, wherein said control element being operative for determining a target loop current on the basis of the variation in a number of CPEs active in the subscriber loop comprises said control element being operative for selecting the target loop current from a set of target loop currents, each target loop current in said set of target loop currents being associated to a respective variation in a number of CPEs active in the subscriber loop.

13. A combination as defined in claim 12, wherein the target loop current determined by said control element when A CPEs are active in the subscriber loop is higher than the target loop current determined by said control element when B CPEs are active in the subscriber loop, where A>B.

14. A combination as defined in claim 13, wherein A is at least 1.

15. A combination as defined in claim 14, wherein the subscriber loop includes a tip conductor and a ring conductor, a CPE active in the subscriber loop being connected across the tip conductor and the ring conductor.

16. A combination as defined in claim 15, wherein said control element includes at least one control input for receiving an input control signal indicative of a magnitude of a current in the tip conductor.

17. A combination as defined in claim 16, wherein:
 a) said control input is a first control input;
 b) said input control signal is a first input control signal; and
 c) said control element includes a second control input for receiving a second input control signal indicative of a magnitude of a current in the ring conductor.

18. A combination as defined in claim 17, wherein said control element is responsive to the first and second input control signals to generate the output control signal.

19. A combination as defined in claim 10, wherein the target loop current is sufficiently high to power a new number of CPEs active in the subscriber loop reflecting the variation in a number of CPEs active in the subscriber loop and sufficiently low to result in a decrease in power consumption at the feed arrangement when the variation in a number of CPEs active in the subscriber loop is a decrease in a number of CPEs active in the subscriber loop.

20. A method for regulating a magnitude of a current in a subscriber loop, comprising:
 a) deriving a data element indicative of a rate of change of the current in the subscriber loop;
 b) processing the data element indicative of a rate of change of the current in the subscriber loop to derive a variation in a number of CPEs active in the subscriber loop;
 c) determining a target loop current on the basis of the variation in a number of CPEs active in the subscriber loop; and
 d) regulating the magnitude of the current to the target loop current.

21. A method as defined in claim 20, wherein the target loop current is sufficiently high to power a new number of CPEs active in the subscriber loop reflecting the variation in a number of CPEs active in the subscriber loop and sufficiently low to result in a decrease in power consumption at a feed arrangement supplying the current in the subscriber loop when the variation in a number of CPEs active in the subscriber loop is a decrease in a number of CPEs active in the subscriber loop.

22. A method as defined in claim 20, wherein said determining a target loop current on the basis of the variation in a number of CPEs active in the subscriber loop comprises selecting the target loop current from a set of target loop currents, each target loop current in said set of target loop currents being associated to a respective variation in a number of CPEs active in the subscriber loop.

23. A feed arrangement for a subscriber loop having a plurality of conductors, comprising:
 a) output means for connection to the conductors of the subscriber loop to impress across the conductors a voltage differential; and
 b) control means for:
  i. deriving a data element indicative of a rate of change of a current in the subscriber loop;
  ii. processing the data element indicative of a rate of change of a current in the subscriber loop to derive a variation in a number of CPEs active in the subscriber loop;
  iii. determining a target loop current on the basis of the variation in a number of CPEs active in the subscriber loop; and
  iv. regulating a magnitude of a current in the subscriber loop to the target loop current.

24. A feed arrangement as defined in claim 23, wherein the target loop current is sufficiently high to power a new number of CPEs active in the subscriber loop reflecting the variation in a number of CPEs active in the subscriber loop and sufficiently low to result in a decrease in power consumption at the feed arrangement when the variation in a number of CPEs active in the subscriber loop is a decrease in a number of CPEs active in the subscriber loop.

25. A feed arrangement as defined in claim 23, wherein said control means for determining a target loop current on the basis of the variation in a number of CPEs active in the subscriber loop comprises means for selecting the target loop current from a set of target loop currents, each target loop current in said set of target loop currents being associated to a respective variation in a number of CPEs active in the subscriber loop.

* * * * *